(12) United States Patent
Ono

(10) Patent No.: US 7,559,710 B2
(45) Date of Patent: Jul. 14, 2009

(54) ROTARY-TORQUE ADJUSTER, INK-RIBBON CONVEYING MECHANISM, AND PRINTER

(75) Inventor: Katsuhisa Ono, Tokyo (JP)

(73) Assignee: Sony Corporation, Tokyo (JP)

( * ) Notice: Subject to any disclaimer, the term of this patent is extended or adjusted under 35 U.S.C. 154(b) by 498 days.

(21) Appl. No.: 11/277,250

(22) Filed: Mar. 23, 2006

(65) Prior Publication Data

US 2006/0216097 A1    Sep. 28, 2006

(30) Foreign Application Priority Data

Mar. 28, 2005    (JP)    ............... P2005-090484

(51) Int. Cl.
*B41J 33/00*    (2006.01)
(52) U.S. Cl. ............ 400/223; 400/236; 192/56.6; 464/147
(58) Field of Classification Search ............ 400/223, 400/225, 235.1, 236, 236.2; 192/56.6, 48.91; 464/47

See application file for complete search history.

(56) References Cited

U.S. PATENT DOCUMENTS

| | | | | |
|---|---|---|---|---|
| 3,664,472 A | * | 5/1972 | Martini et al. ............ | 192/12 R |
| 4,613,026 A | * | 9/1986 | Ohzono et al. ............ | 192/85 AA |
| 5,820,280 A | * | 10/1998 | Fox ............ | 400/611 |
| 6,034,708 A | * | 3/2000 | Adams et al. ............ | 347/217 |
| 6,637,957 B2 | * | 10/2003 | Mastinick et al. ............ | 400/223 |
| 6,764,234 B2 | | 7/2004 | Ono et al. | |

FOREIGN PATENT DOCUMENTS

| | | | |
|---|---|---|---|
| JP | 06-316139 | * | 11/1994 |
| JP | 2002-234241 | * | 2/2001 |

* cited by examiner

*Primary Examiner*—Daniel J Colilla
*Assistant Examiner*—Marissa L Ferguson-Samreth
(74) *Attorney, Agent, or Firm*—Sonnenschein Nath & Rosenthal LLP

(57) ABSTRACT

A rotary-torque adjuster that adjusts rotary torque of a rotational member includes a rotary shaft, the rotational member secured to the rotary shaft and rotating integrally with the rotary shaft, a plurality of clutch disks rotatably attached to the rotary shaft, a driver that drives the clutch disks, a plurality of presser components attached to the rotary shaft and rotating integrally with the rotary shaft, the presser components sandwiching opposite surfaces of the clutch disks by a predetermined pressure, and a drive transmission unit that makes a selection from among the plurality of clutch disks so as to transmit a driving force from the driver to the selected one or more clutch disks. The drive transmission unit changes the selection of the clutch disks to which the driving force from the driver is to be transmitted so as to change the rotary torque of the rotational member.

11 Claims, 7 Drawing Sheets

ROTARY-TORQUE ADJUSTER, INK-RIBBON CONVEYING MECHANISM, AND PRINTER

CROSS REFERENCES TO RELATED APPLICATIONS

The present invention contains subject matter related to Japanese Patent Application JP 2005-090484 filed in the Japanese Patent Office on Mar. 28, 2005, the entire contents of which are incorporated herein by reference.

BACKGROUND OF THE INVENTION

1. Field of the Invention

The present invention relates to a rotary-torque adjuster that adjusts rotary torque in the process of transmission of a driving force from a driver, to an ink-ribbon conveying mechanism having such a rotary-torque adjuster used for conveying an ink ribbon, and to a printer equipped with such an ink-ribbon conveying mechanism.

2. Description of the Related Art

In printers that apply ink ribbons, if an ink ribbon is loose in the process of a printing operation, the ink ribbon may wrinkle, which may lead to a print error. Generally, an ink ribbon fed from a feed spool is given a back tension in order to avoid such looseness of the ink ribbon. Moreover, in a take-up spool, a take-up force is adjusted in view of the back tension. Accordingly, these measures are taken in order to maintain a constant ribbon tension between the feed spool and the take-up spool.

There are various techniques for applying a ribbon tension to an ink ribbon. One example is providing each spool with a brake mechanism including, for example, a torque clutch or a torque limiter. In another example, a resilient member, such as a leaf spring, is used.

However, as the diameter of the ink ribbon wound around the feed spool and the diameter of the ink ribbon wound around the take-up spool change gradually in the course of printing, the torque acting on each of the spools changes. Therefore, there are various disclosed techniques for applying a constant ribbon tension to the ink ribbon.

For example, Japanese Unexamined Patent Application Publication No. 2002-234241 discloses a structure in which the rotary torque of a shaft that drives the take-up spool is determined by a sandwiching pressure of presser components. In this structure, a spring compression gear meshed with the shaft is rotated so as to change a biasing force applied to the presser components. Thus, the rotary torque is adjustable in accordance with the wound diameter of the ink ribbon around the spools.

On the other hand, Japanese Unexamined Patent Application Publication No. 6-316139 discloses a technique in which a motor is controlled by counting the number of pulses generated in response to rotations of the take-up spool and the feed spool and then calculating a motor voltage related with motor torque and the rotating speed in accordance with the wound diameter of the ink ribbon around the spools.

SUMMARY OF THE INVENTION

However, Japanese Unexamined Patent Application Publication No. 2002-234241 is problematic in that a long time is necessary for adjusting the rotary torque since the spring compression gear has to be rotated for every adjustment process.

On the other hand, Japanese Unexamined Patent Application Publication No. 6-316139 is problematic in that the control operation is complicated, and that there may be variations in mechanisms depending on different devices, which may possibly impair the conveying stability of the ink ribbon.

Accordingly, it is desirable to achieve stable torque with a low-cost structure.

According to an embodiment of the present invention, there is provided a rotary-torque adjuster that adjusts rotary torque of a rotational member. The rotary-torque adjuster includes a rotary shaft, the rotational member secured to the rotary shaft and rotating integrally with the rotary shaft, a plurality of clutch disks rotatably attached to the rotary shaft, a driver that drives the clutch disks, a plurality of presser components attached to the rotary shaft and rotating integrally with the rotary shaft, the presser components sandwiching opposite surfaces of the clutch disks by a predetermined pressure, and a drive transmission unit that makes a selection from among the plurality of clutch disks so as to transmit a driving force from the driver to the selected one or more clutch disks. The drive transmission unit changes the selection of the clutch disks to which the driving force from the driver is to be transmitted so as to change the rotary torque of the rotational member.

In the rotary-torque adjuster according to the above-referenced embodiment of the present invention, the rotational member is rotated in response to the transmission of the driving force from the driver, and the drive transmission unit makes a selection from among the plurality of clutch disks so as to transmit the driving force to the selected one or more clutch disks.

Accordingly, on the basis of the selection of the clutch disks to which the driving force is transmitted, a plurality of rotary torques can be attained.

DESCRIPTION OF THE PREFERRED EMBODIMENTS

Figure 1:
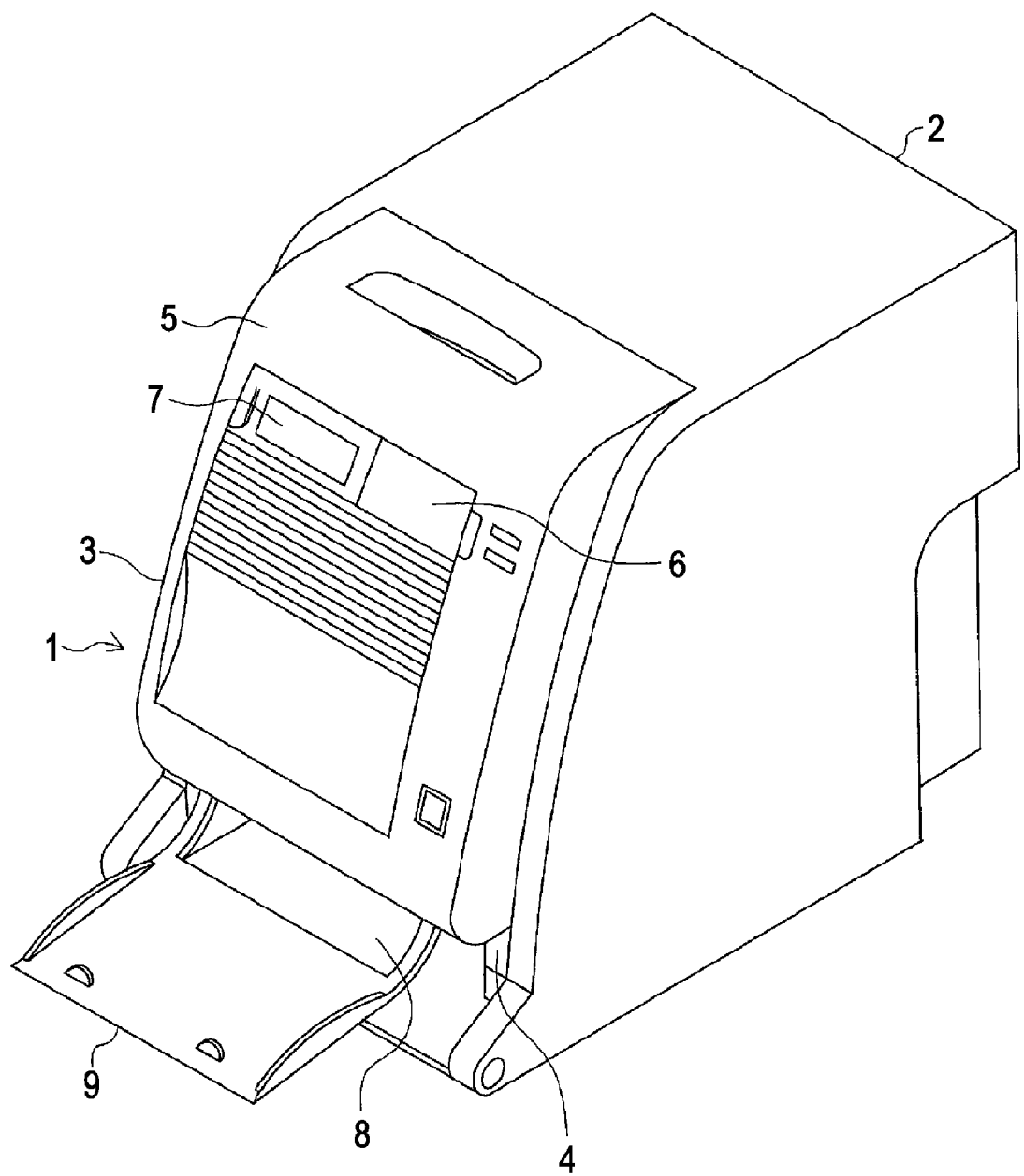
FIG. 1 is a perspective view of a printer according to an embodiment of the present invention.

In preferred embodiments of the present invention described below, there are provided a rotary shaft 41, an engagement part 12A engageable with a take-up spool and functioning as a rotational member, a motor 21 functioning as a driver, clutch disks 53 (53A and 53B), presser components 51 (51A to 51C), and a drive transmission unit defined by a worm gear 22, a worm wheel 24, a gear 25, a sun gear 27, a pendulum 29, planet gears 30A and 30B, a planet gear 32, an idle gear 34, and gears 52A and 52B.

The preferred embodiments of the present invention will now be described with reference to the drawings.

A rotary-torque adjuster according to an embodiment of the present invention is applied in an ink-ribbon conveying mechanism, and the ink-ribbon conveying mechanism is installed in a printer.

FIG. 1 is a perspective view of a printer 1 according to an embodiment of the present invention. The printer 1 includes a housing 2 and a door 3 attached to a front face of the housing 2. The front face of the housing 2 is also provided with a power switch 4. The door 3 has a door panel 5 attached thereto. The front surface of the door panel 5 is provided with an operating panel 6 having various switches, and a liquid-crystal panel 7 for displaying various messages. Furthermore, a catch tray 9 having an ejection opening 8 is attached to a lower end of the door 3.

Figure 2:
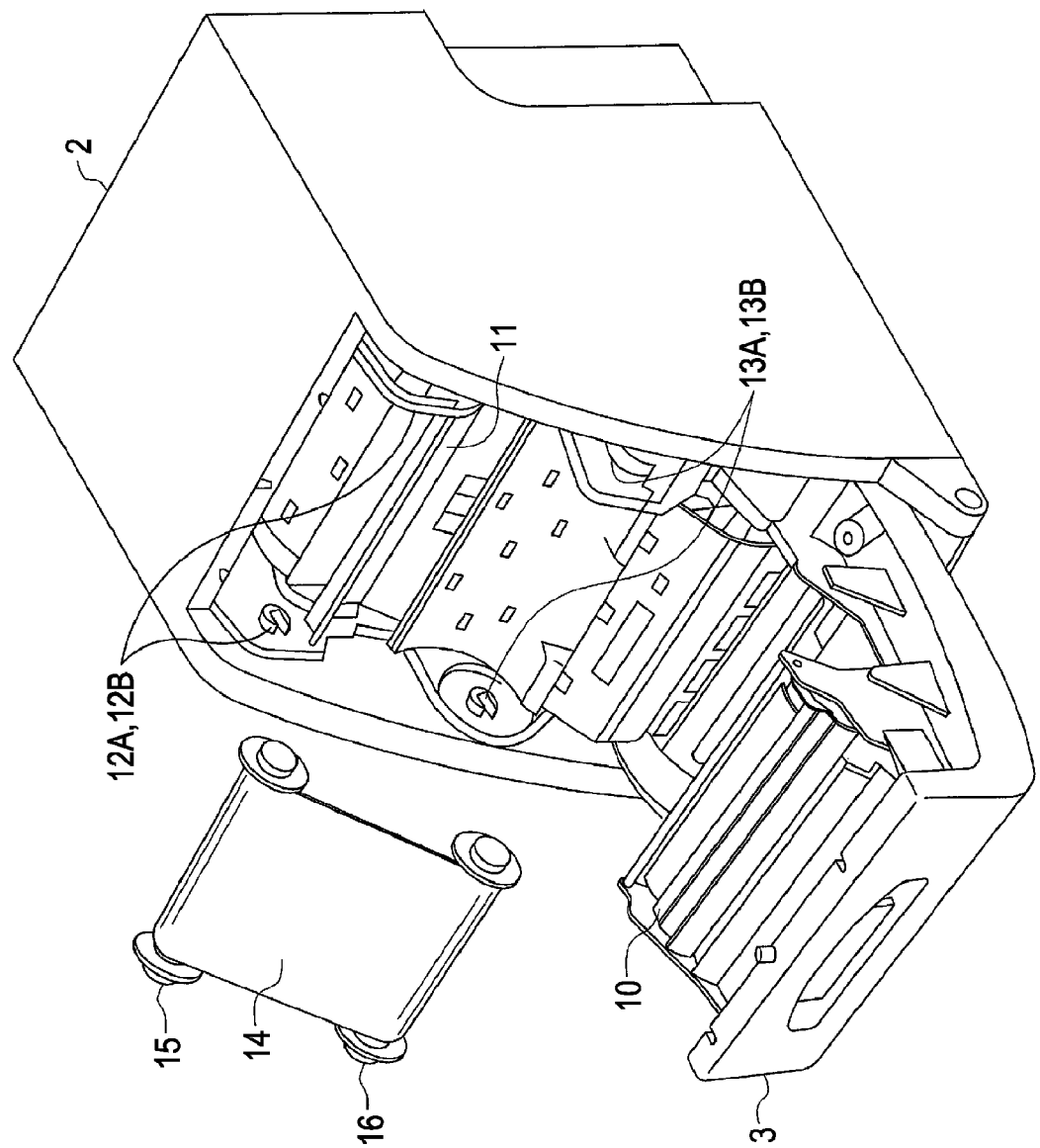
FIG. 2 is a perspective view showing a state in which a door of the printer is opened.

FIG. 2 is a perspective view showing a state in which the door 3 of the printer 1 is opened. Moreover, FIG. 2 shows a disassembled state of an ink ribbon 14 and a take-up spool 15 and feed spool 16 disposed at opposite ends of the ink ribbon 14.

The rear surface of the door 3 is provided with a thermal head 10. Furthermore, a platen 11 is disposed inside the housing 2 at a position facing the thermal head 10 when the door 3 is closed. Although not shown, a grip roller and a pinch roller for conveying roll paper are disposed adjacent to the platen 11.

Furthermore, inside the housing 2, an engagement unit 12 including a pair of engagement parts 12A, 12B engageable with the take-up spool 15 is disposed above the platen 11. Moreover, an engagement unit 13 including a pair of engagement parts 13A, 13B engageable with the feed spool 16 is disposed below the platen 11. In a state where the take-up spool 15 and the feed spool 16 are respectively engaged with the engagement unit 12 and the engagement unit 13, the take-up spool 15 and the feed spool 16 are disposed parallel to the platen 11 in a rotatable fashion. The ink ribbon 14 is disposed so as to move above the platen 11. When the door 3 is closed, the ink ribbon 14 is positioned between the platen 11 and the thermal head 10.

Figure 3:
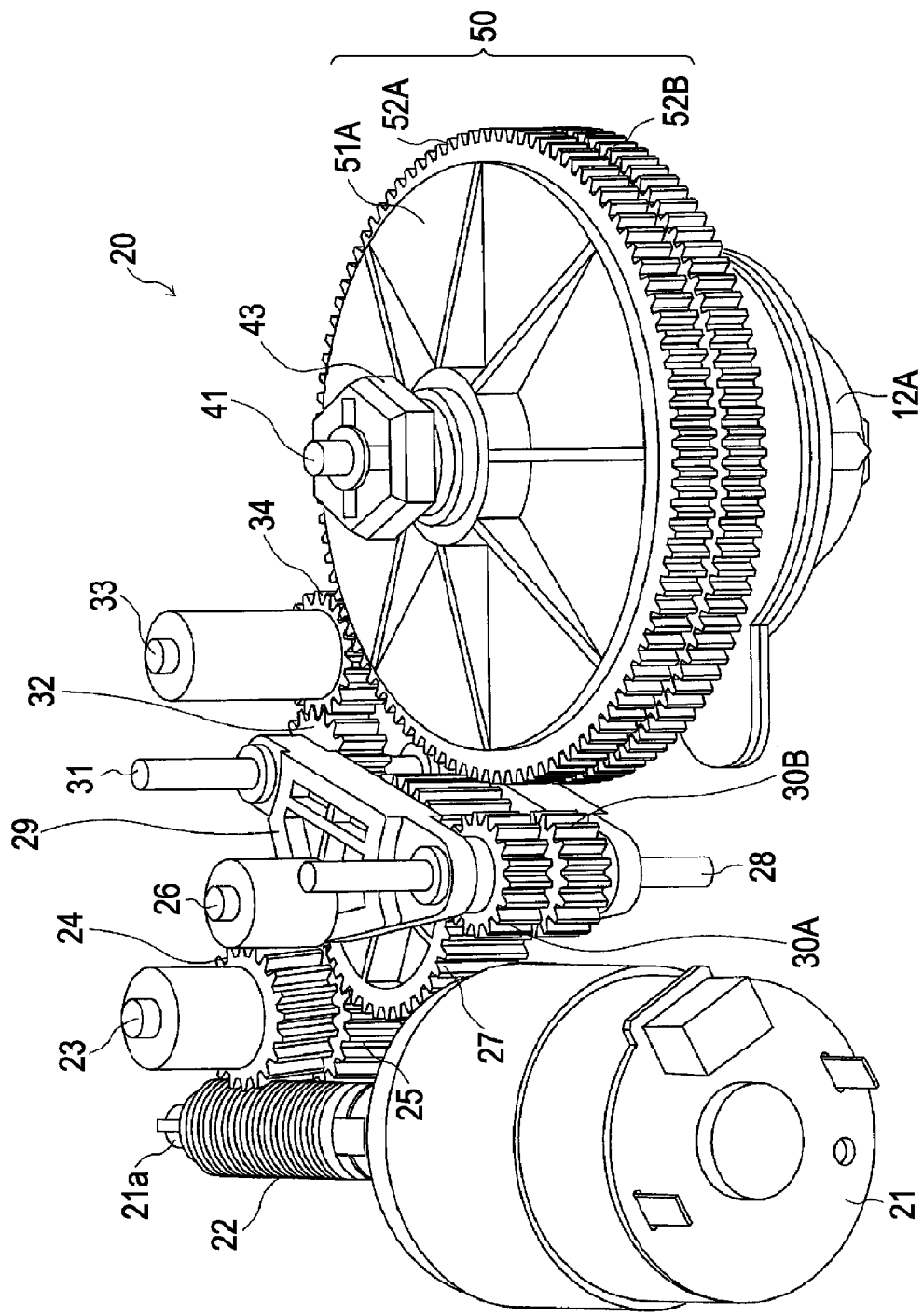
FIG. 3 is a perspective view of an ink-ribbon conveying mechanism according to an embodiment of the present invention.
Figure 4:
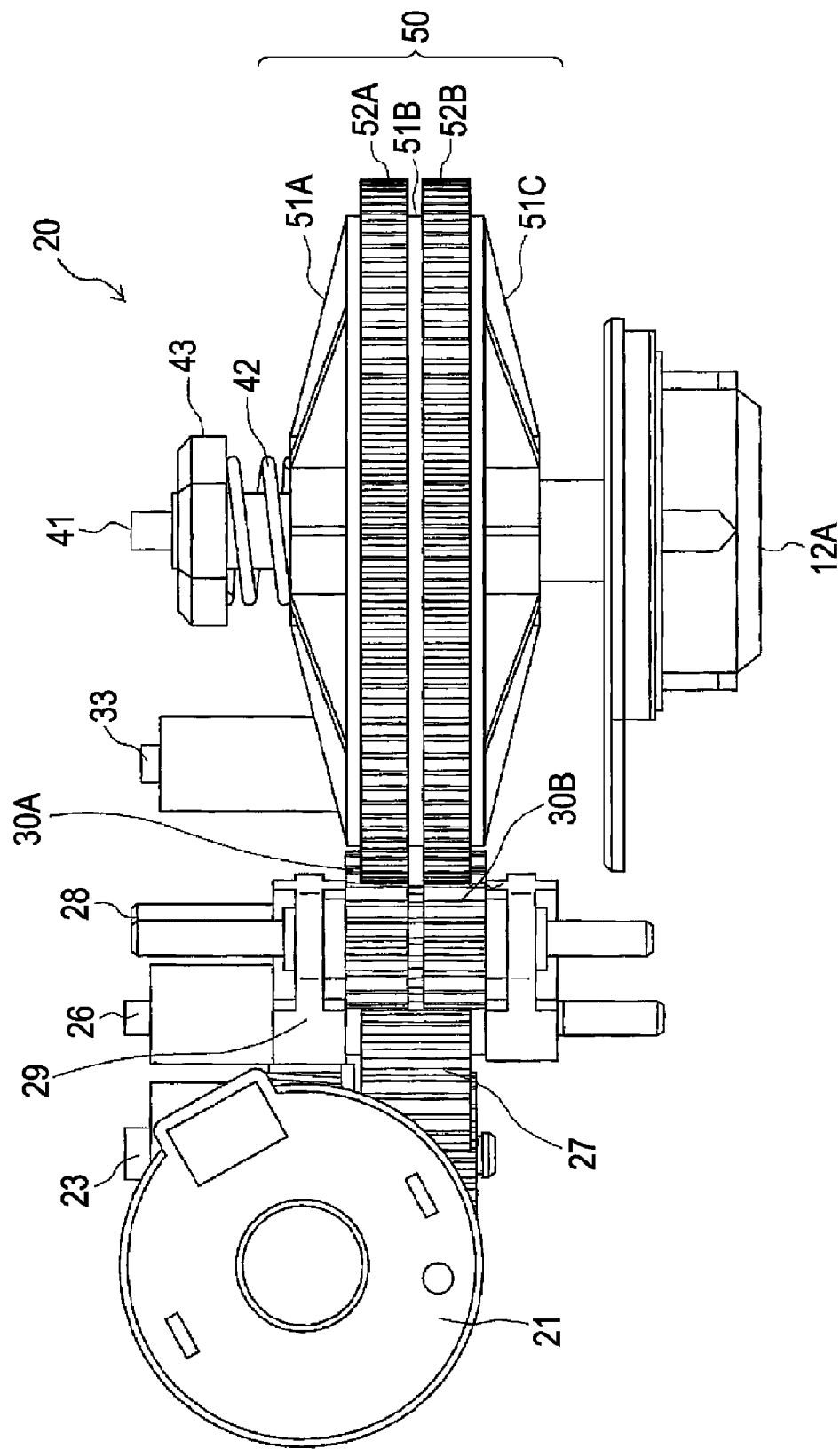
FIG. 4 is a front view of the ink-ribbon conveying mechanism.
Figure 5:
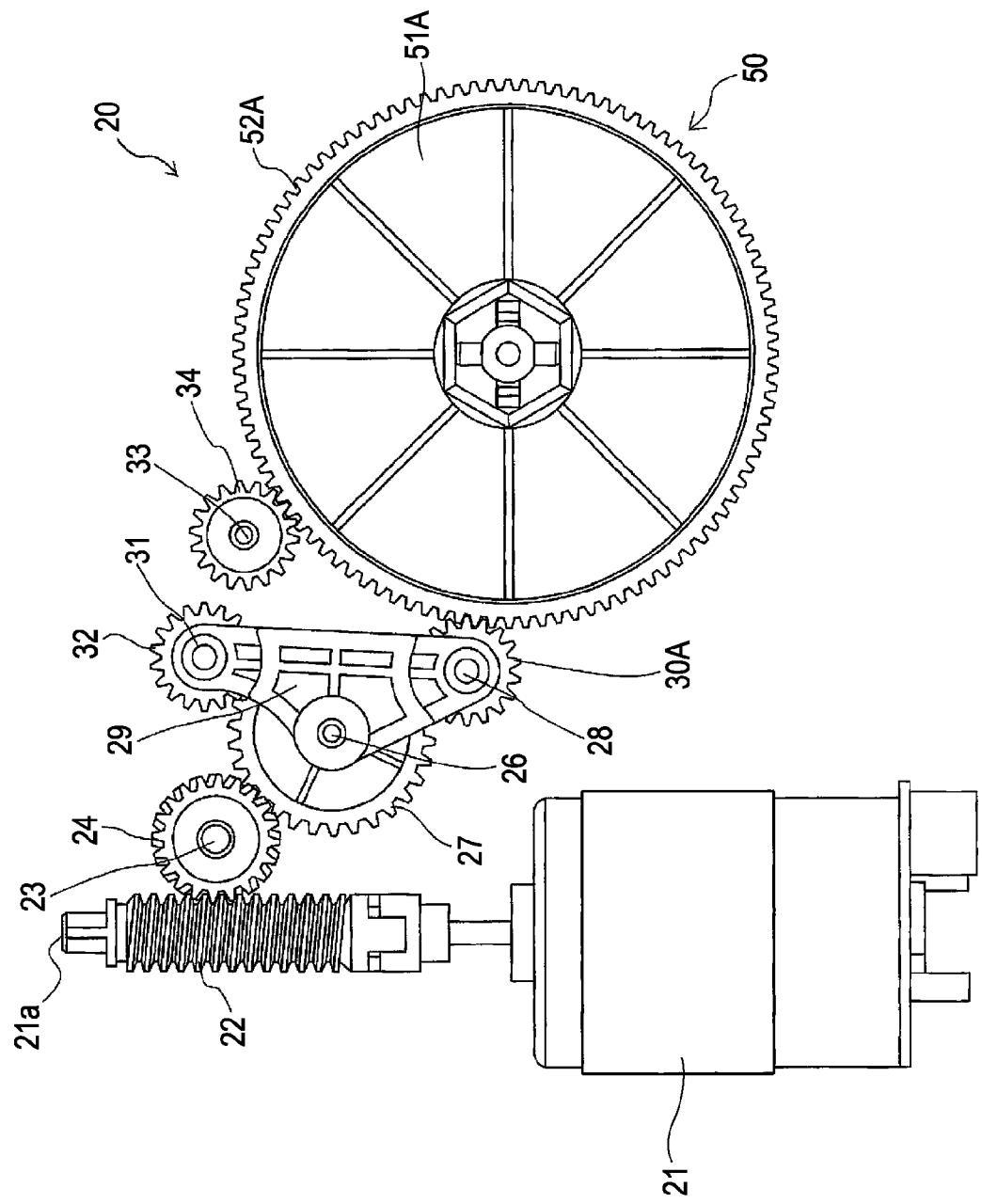
FIG. 5 is a plan view of the ink-ribbon conveying mechanism.
Figure 6:
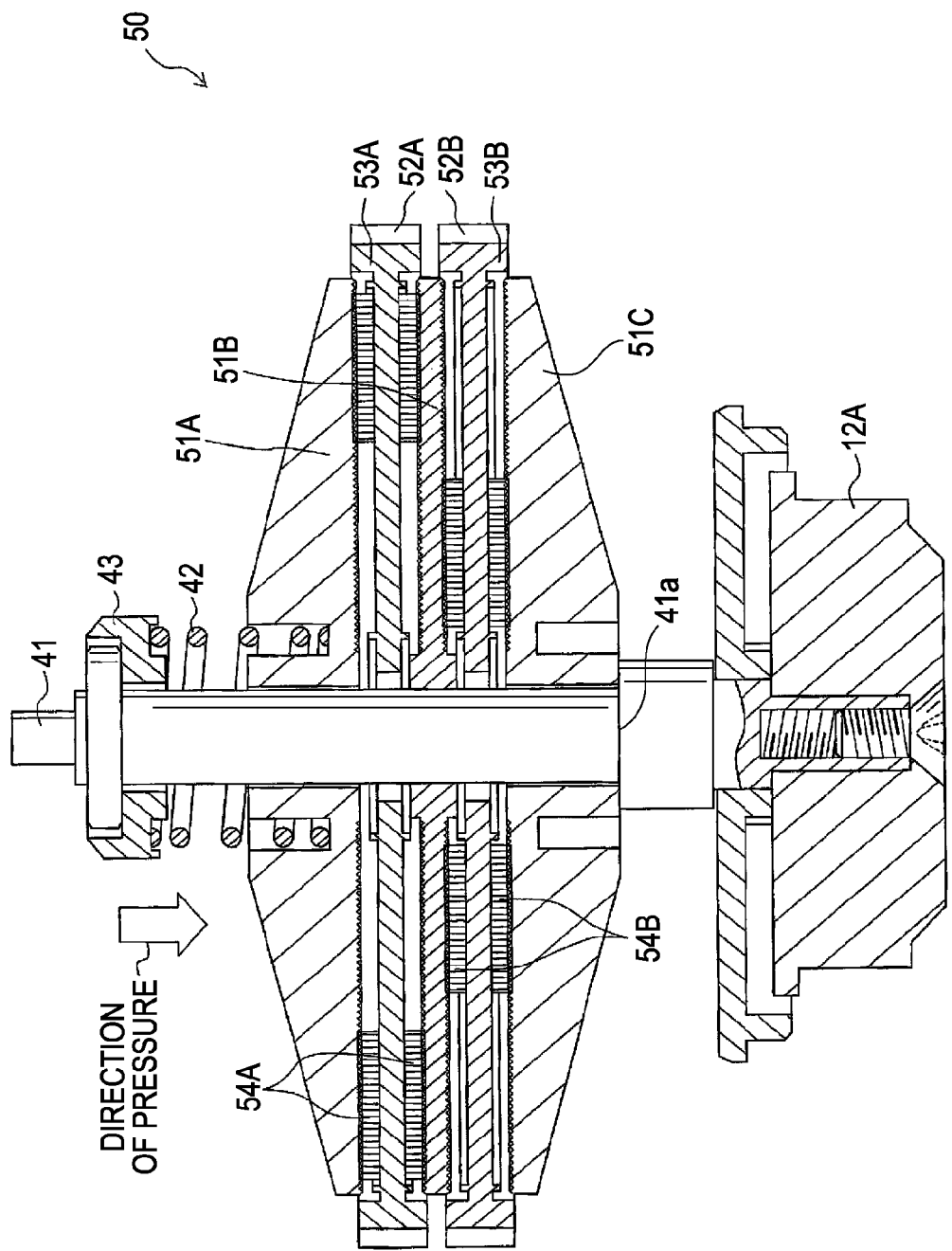
FIG. 6 is a vertical sectional view of a torque limiter included in the ink-ribbon conveying mechanism, as viewed from the front side thereof.

FIG. 3 is a perspective view of an ink-ribbon conveying mechanism 20 according to an embodiment of the present invention. FIG. 4 is a front view of the ink-ribbon conveying mechanism 20. FIG. 5 is a plan view of the ink-ribbon conveying mechanism 20. FIG. 6 is a vertical sectional view of a torque limiter 50 included in the ink-ribbon conveying mechanism 20, as viewed from a front side thereof.

Referring to FIGS. 3 to 5, the motor 21 functioning as a driver for the ink-ribbon conveying mechanism 20 has a rotary shaft 21a. The rotary shaft 21a has the worm gear 22 fixed thereto. A rotatable supporting shaft 23 is disposed adjacent to the worm gear 22. The worm wheel (spiral gear) 24 is secured to an upper portion of the supporting shaft 23 and is meshed with the worm gear 22. On the other hand, the gear 25 is secured to a lower portion of the supporting shaft 23 and is disposed concentric to the worm wheel 24.

Furthermore, another rotatable supporting shaft 26 is disposed adjacent to the supporting shaft 23. The sun gear 27 is attached to the supporting shaft 26 and is meshed with the gear 25. Moreover, the supporting shaft 26 also has the pendulum 29 attached rotatably thereto.

Two ends of the pendulum 29 are respectively provided with supporting shafts 28 and 31. The supporting shaft 28 has the planet gears 30A and 30B rotatably attached thereto, which are arranged in two levels in the vertical direction. The planet gears 30A and 30B are meshed with the sun gear 27. On the other hand, the supporting shaft 31 has the planet gear 32 attached thereto in a rotatable fashion. The planet gear 32 is meshed with the sun gear 27.

To the right of the pendulum 29 is disposed the torque limiter 50. The torque limiter 50 is provided with the gears 52A and 52B that are arranged in two levels in the vertical direction.

The upper gear 52A meshes with the idle gear 34 in a rotatable fashion, but the lower gear 52B does not mesh with the idle gear 34. The idle gear 34 is rotatably supported by a supporting shaft 33.

The idle gear 34 is provided for maintaining the rotational direction of the gears 52A and 52B in one direction regardless of whether the motor 21 rotates in the forward or reverse direction.

Referring to FIG. 5, when the pendulum 29 rotates clockwise around the supporting shaft 26, the planet gear 32 meshes with the idle gear 34. In contrast, when the pendulum 29 rotates counterclockwise in FIG. 5 around the supporting shaft 26, the two planet gears 30A and 30B respectively mesh with the gears 52A and 52B.

The torque limiter 50 will now be described in detail.

Referring to FIG. 6, the engagement part 12A for the take-up spool 15 is secured to a lower end of the rotary shaft 41. Thus, the rotary shaft 41 and the engagement part 12A rotate integrally. Furthermore, the rotary shaft 41 supports a presser component 51A, a clutch disk 53A, a presser component 51B, a clutch disk 53B, and a presser component 51C disposed one on top of another in that order from top to bottom in FIG. 6.

The rotary shaft 41 is D-shaped in cross section. Each of the presser components 51A to 51C has a D-shaped shaft hole so as to be engageable with the rotary shaft 41 having the D-shaped cross section. Accordingly, when the presser components 51A to 51C are fitted to the rotary shaft 41, the presser components 51A to 51C are rotatable integrally with the rotary shaft 41 and are supported in a shiftable fashion only in the axial direction of the rotary shaft 41.

On the other hand, each of the clutch disks 53A and 53B has a circular rotational hole. The clutch disks 53A and 53B are thus rotatable around the rotary shaft 41 and are supported in a shiftable fashion in the axial direction of the rotary shaft 41.

Furthermore, the gear 52A mentioned above is provided around the outer periphery of the clutch disk 53A. Similarly, the gear 52B is provided around the outer periphery of the clutch disk 53B.

Furthermore, felt sheets 54A functioning as friction members are adhered to opposite surfaces of the clutch disk 53A. The felt sheets 54A are provided for generating a predetermined frictional force between the presser component 51A and the clutch disk 53A and between the clutch disk 53A and the presser component 51B. In this embodiment, the felt sheets 54A are annular-shaped (donut-shaped). The felt sheets 54A are given a dimension such that the two felt sheets 54A are respectively in contact with outer periphery areas of the presser component 51A and the clutch disk 53A and outer periphery areas of the clutch disk 53A and the presser component 51B.

Similarly, felt sheets 54B composed of the same material as the felt sheets 54A (having the same coefficient of friction) are adhered to opposite surfaces of the clutch disk 53B. The felt sheets 54B are annular-shaped like the felt sheets 54A, but are given a dimension different from that of the felt sheets 54A. Specifically, the felt sheets 54B are given a dimension such that the two felt sheets 54B are respectively in contact with inner periphery areas of the presser component 51B and the clutch disk 53B and inner periphery areas of the clutch disk 53B and the presser component 51C.

Furthermore, as shown in FIG. 6, a (compression coil) spring 42 functioning as a bias member is engaged with an upper portion of the rotary shaft 41. A lower end of the spring 42 in FIG. 6 is in contact with the presser component 51A, whereas an upper end is in contact with a stationary member 43 secured to the rotary shaft 41. On the other hand, the presser component 51C is retained in position by a step portion 41a of the rotary shaft 41. Consequently, the spring 42 presses the presser components 51A to 51C and the clutch disks 53A and 53B downward in FIG. 6 in the axial direction of the rotary shaft 41.

Accordingly, if the clutch disks 53A and 53B are rotated in a state where a load applied to the rotary shaft 41 is low, a slip (relative movement) is not generated between the presser component 51A and the clutch disk 53A nor between the clutch disk 53A and the presser component 51B due to the felt sheets 54A. Therefore, the clutch disk 53A and the presser components 51A and 51B rotate integrally. Likewise, a slip is not generated between the presser component 51B and the clutch disk 53B nor between the clutch disk 53B and the presser component 51C due to the felt sheets 54B, and therefore, the clutch disk 53B and the presser components 51B and 51C rotate integrally. Since the rotary shaft 41 is rotated integrally with these components and disks, the engagement part 12A (and the take-up spool 15) is rotated accordingly.

As the load applied to the rotary shaft 41 becomes higher, a slip (relative movement) is generated between the clutch disk 53A and each of the presser components 51A and 51B and between the clutch disk 53B and each of the presser components 51B and 51C. As a result, only the clutch disks 53A and 53B rotate.

When the motor 21 is rotated in, for example, the forward direction (CW) as viewed from an electric-contact side of the motor 21, the worm wheel 24 and the gear 25 rotate counterclockwise in FIG. 5. Thus, the sun gear 27 rotates clockwise in FIG. 5, allowing the pendulum 29 to rotate clockwise. This moves the planet gear 32 to a first position where it meshes with the idle gear 34. Subsequently, the planet gear 32 rotates counterclockwise and the idle gear 34 rotates clockwise, thus allowing the gear 52A (the clutch disk 53A) to rotate counterclockwise. Accordingly, the rotary shaft 41 and the engagement part 12A are rotated counterclockwise (CCW).

On the other hand, when the motor 21 is rotated in the reverse direction (CCW) as viewed from the electric-contact side, the worm wheel 24 and the gear 25 rotate clockwise in FIG. 5. Thus, the sun gear 27 rotates counterclockwise in FIG. 5, allowing the pendulum 29 to rotate counterclockwise. This moves the planet gears 30A and 30B to a second position where they respectively mesh with the gears 52A and 52B. Subsequently, the planet gears 30A and 30B rotate clockwise, thus allowing the gear 52A (the clutch disk 53A) and the gear 52B (the clutch disk 53B) to rotate counterclockwise. Accordingly, the rotary shaft 41 and the engagement part 12A are rotated counterclockwise (CCW).

In the case where the motor 21 is rotated in the forward direction as viewed from the electric-contact side, since the idle gear 34 and the gear 52A (the clutch disk 53A) are meshed with each other, the presser components 51A and 51B are accordingly rotated due to the frictional force of the felt sheets 54A provided on the opposite surfaces of the clutch disk 53A. Accordingly, this allows the clutch disk 53B, the presser component 51C, the rotary shaft 41, and the engagement part 12A to rotate integrally.

In contrast, in the case where the motor 21 is rotated in the reverse direction as viewed from the electric-contact side, since the planet gears 30A and 30B respectively mesh with the gears 52A and 52B, the presser components 51A to 51C are accordingly rotated by the clutch disks 53A and 53B and the frictional force of the felt sheets 54A and 54B. Accordingly, this allows the rotary shaft 41 and the engagement part 12A to rotate integrally.

Consequently, the frictional force acting on the torque limiter 50 is greater when the motor 21 is rotated in the reverse rotation than in the forward rotation by an amount of friction generated by the felt sheets 54B between the presser component 51B and the clutch disk 53B and between the clutch disk 53B and the presser component 51C. In other words, the rotary torque of the take-up spool 15 is increased by that amount of friction.

The rotational direction of the motor 21 is switched in accordance with a wound diameter of the ink ribbon 14 wound around the take-up spool 15.

Figure 7:
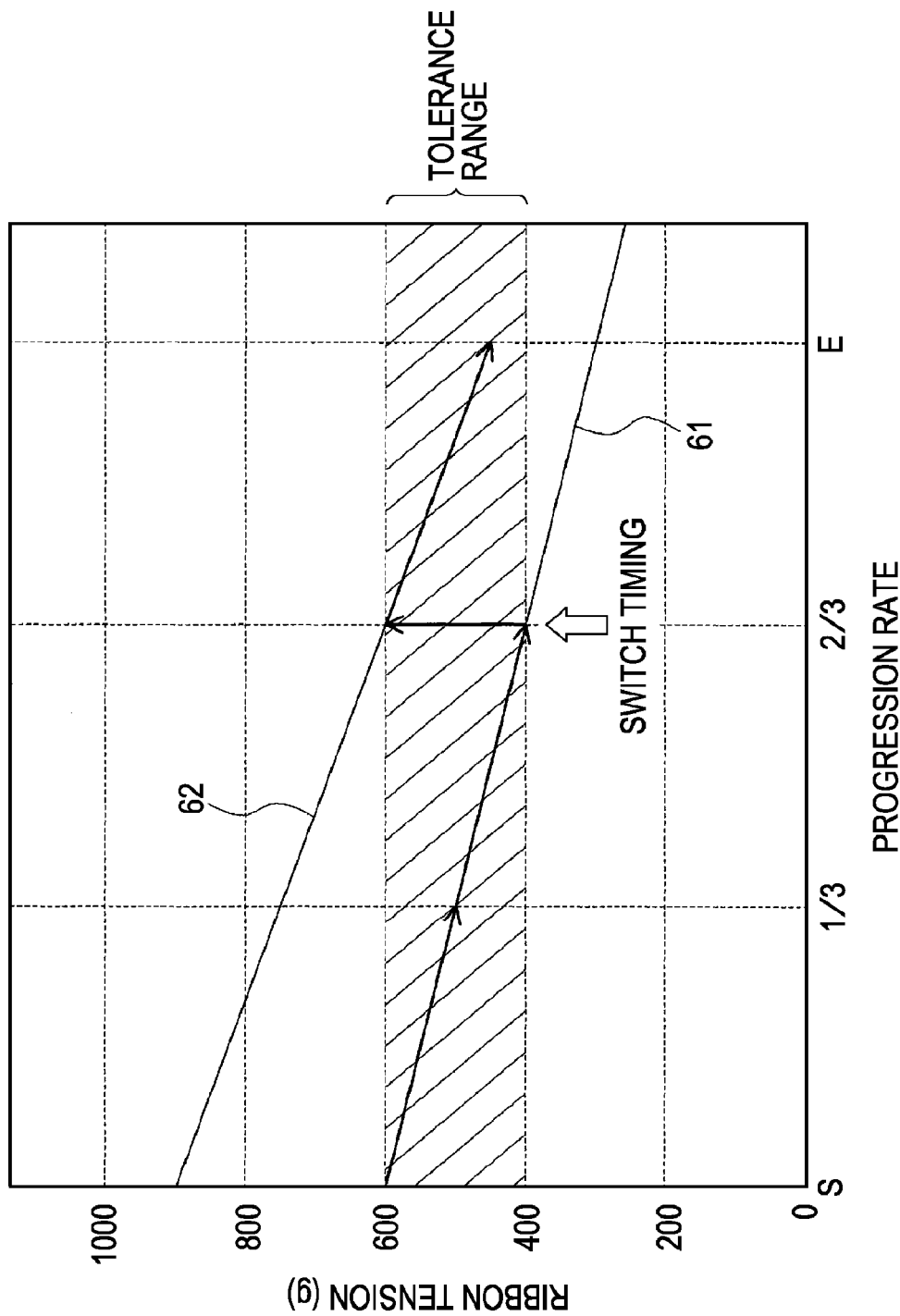
FIG. 7 is a graph showing a relationship between a wound diameter of an ink ribbon around a take-up spool and a ribbon tension.

FIG. 7 is a graph showing a relationship between the wound diameter of the ink ribbon 14 around the take-up spool 15 and a ribbon tension. In the graph, the horizontal axis represents a progression rate from an initial value point (i.e. initial take-up point) S to a final take-up point (i.e. maximum wound diameter) E, and the vertical axis represents a ribbon tension (g).

Referring to FIG. 7, a line 61 indicates a mode in which the gear 52A and the idle gear 34 are meshed with each other such that a driving force is transmitted only to the clutch disk 53A. A line 62 indicates a mode in which the gears 52A and 52B are respectively meshed with the planet gears 30A and 30B such that a driving force is transmitted to both clutch disks 53A and 53B.

In the mode for transmitting the driving force only to the clutch disk 53A, the ribbon tension at the initial value point S is 600 g. As the wound diameter of the ink ribbon 14 increases, the ribbon tension decreases. In this embodiment, the wound diameter increases by about two times at a point where the ink ribbon 14 is completely used up, and the ribbon tension is reduced to 300 g at the final take-up point E.

On the other hand, in the mode for transmitting the driving force to both clutch disks 53A and 53B, the ribbon tension at the initial value point S is 900 g. As the wound diameter of the ink ribbon 14 increases, the ribbon tension decreases. The ribbon tension is reduced to about 450 g at the final take-up point E.

As mentioned above, in this embodiment, the felt sheets 54A adhered to the clutch disk 53A and the felt sheets 54B adhered to the clutch disk 53B have different inner diameters and outer diameters. In FIG. 7, the line 62 shows characteristics in which the ribbon tension is greater than that of the line 61 by about 1.5 times. There are various parameters for determining the degree of frictional force of the clutch disks 53A and 53B. The parameters include, for example, shapes, materials, and adhering locations of the felt sheets 54A and 54B. Accordingly, these parameters may be selected in accordance with design conditions.

In the printer 1 according to this embodiment, a tolerance range of the ribbon tension for maintaining a high print quality is within 400 to 600 g, as shown in FIG. 7. Therefore, a control operation is implemented by driving the clutch disk 53A singularly from the initial value point S to a two-thirds point of the progression rate at which the lower tolerance limit is 400 g. Subsequently, the operation switches to another mode in which both clutch disks 53A and 53B are driven until reaching the final take-up point E. In other words, the motor 21 is rotated in the forward direction up to the two-thirds point of the progression rate, and is then rotated in the reverse direction from the two-thirds point onward. This allows the ribbon tension to be maintained within the tolerance range.

Although not shown, there are various known types of detection mechanisms for detecting the wound diameter of the ink ribbon 14. In one example, a detector may be disposed in direct contact with the outermost periphery of the ink ribbon 14 wound around the take-up spool 15 so as to detect the wound diameter in a mechanical fashion. In another example, the wound diameter may be calculated on the basis of FG pulses output from rotary detectors provided for the feed spool 16 and the take-up spool 15.

Accordingly, the ribbon tension that varies in accordance with the wound diameter of the ink ribbon 14 can be maintained constantly within the tolerance range by simply switching the rotational direction of the motor 21 on the basis of a detection result of the wound diameter. This ensures a stable print quality.

The ribbon tension can be adjusted to a preferred value on the basis of, for example, the specifications of the clutch disks 53A and 53B, the dimensions and frictional forces of the felt sheets 54A and 54B, and the biasing force of the spring 42.

Furthermore, the rotary torque can be changed instantaneously by simply rotating the motor 21 functioning as a driver in the reverse direction. Moreover, the motor 21 serves as a common driver for the switching of the clutch disks 53A and 53B and for the driving of the take-up spool 15. Accordingly, this contributes to a simplified structure, lower manufacturing costs, higher reliability, and an overall size reduction.

Furthermore, since the mechanism of the rotary-torque adjuster is not installed in every ink-ribbon cassette, the above embodiments achieve lower costs from manufacture to disposal and are advantageous from an environmental standpoint.

The technical scope of the present invention is not limited to the above embodiments, and modifications are permissible within the scope and spirit of the present invention.

In the embodiments described above, a desired rotary torque is attained by moving the pendulum 29 on the basis of a detection result of the wound diameter of the ink ribbon 14 and changing the number of clutch disks 53 to which a driving force is to be transmitted. Alternatively, the rotary torque may be adjusted by switching between the clutch disks 53A and 53B of the plurality of clutch disks 53.

Although gears are used in the drive transmission unit for transmission between the clutch disks 53 and the rotary driving system in the above embodiments, the gears may be replaced with, for example, rubber rollers. In other words, the drive transmission unit may be any type of a unit as long as it has the capability to transmit a driving force by means of a predetermined frictional force.

Furthermore, the number of clutch disks 53 is adjustable. For example, although the ribbon tension is switched once in the course of a take-up process in the above embodiments, the number of clutch disks 53 may be increased so that the ribbon tension can be switched twice, three times, and so on.

In the above embodiments, the felt sheets 54A and 54B are adhered at different locations (with different surface areas). Alternatively, the felt sheets 54A and 54B may be adhered at corresponding locations (with the same surface area). Furthermore, the felt sheets 54A may have a coefficient of friction different from that of the felt sheets 54B.

According to the above embodiments, the rotary torque of the engagement part 12A functioning as a rotational member can be adjusted by selecting the clutch disks to which a driving force is to be transmitted. Consequently, even if a load on the engagement part 12A changes, the rotary torque is maintained within a predetermined range.

It should be understood by those skilled in the art that various modifications, combinations, sub-combinations and alterations may occur depending on design requirements and other factors insofar as they are within the scope of the appended claims or the equivalents thereof.

What is claimed is:

1. A rotary-torque adjuster that adjusts rotary torque of a rotational member, the rotary-torque adjuster comprising:
   a rotary shaft;
   the rotational member secured to the rotary shaft and rotating integrally with the rotary shaft;
   a plurality of clutch disks rotatably attached to the rotary shaft;
   a driver that drives the clutch disks;
   a plurality of presser components attached to the rotary shaft and rotating integrally with the rotary shaft, the presser components sandwiching opposite surfaces of the clutch disks by a predetermined pressure; and
   a drive transmission unit that makes a selection from among the plurality of clutch disks so as to transmit a driving force from the driver to the selected one or more clutch disks,
   wherein the drive transmission unit changes the selection of the clutch disks to which the driving force from the driver is to be transmitted so as to change the rotary torque of the rotational member.

2. The rotary-torque adjuster according to claim 1, wherein the presser components are shiftable in an axial direction of the rotary shaft, and
   wherein the rotary-torque adjuster further comprises a bias member that presses the presser components in the axial direction so as to allow the presser components to sandwich the clutch disks by the predetermined pressure.

3. The rotary-torque adjuster according to claim 1, wherein the drive transmission unit switches between one mode in which the drive transmission unit transmits the driving force to at least one of the clutch disks and another mode so as to change the selection of the clutch disks to which the driving force from the driver is to be transmitted.

4. The rotary-torque adjuster according to claim 1, wherein each clutch disk has a gear disposed around an outer periphery thereof,
   wherein the drive transmission unit is meshable with the gears of the clutch disks and is shiftable between a first position and a second position in accordance with a rotational direction of the driver, and
   wherein the drive transmission unit makes a different selection of the gears with which the unit meshes in accordance with the first position and the second position so as to change the selection of the clutch disks to which the driving force from the driver is to be transmitted.

5. The rotary-torque adjuster according to claim 1, wherein the presser components and the clutch disks have friction members intervening therebetween, and
   wherein the driving force received by the clutch disks is transmitted to the presser components by means of a frictional force of the friction members.

6. The rotary-torque adjuster according to claim 5, wherein the friction members include a first friction member disposed between one of the presser components and one of the clutch disks, and a second friction member disposed between another presser component and another clutch disk, the first friction member and the second friction member having different contact areas.

7. The rotary-torque adjuster according to claim 5, wherein the friction members include a first friction member disposed between one of the presser components and one of the clutch disks, and a second friction member disposed between another presser component and another clutch disk, the first friction member and the second friction member being attached at different radial positions with respect to the center of rotation.

8. The rotary-torque adjuster according to claim 5, wherein the friction members include a first friction member disposed between one of the presser components and one of the clutch disks, and a second friction member disposed between another presser component and another clutch disk, the first friction member having a coefficient of friction different from that of the second friction member.

9. An ink-ribbon conveying mechanism that adjusts rotary torque of a take-up spool, the ink-ribbon conveying mechanism comprising:
   a feed spool that feeds an ink ribbon;
   the take-up spool linked with a rotary shaft and rotating integrally with the rotary shaft so as to take up the ink ribbon;
   a plurality of clutch disks rotatably attached to the rotary shaft;
   a plurality of presser components attached to the rotary shaft and rotating integrally with the rotary shaft, the presser components sandwiching opposite surfaces of the clutch disks by a predetermined pressure;
   a driver that drives the clutch disks; and
   a drive transmission unit that makes a selection from among the plurality of clutch disks so as to transmit a driving force from the driver to the selected one or more clutch disks,
   wherein the drive transmission unit changes the selection of the clutch disks to which the driving force from the driver is to be transmitted so as to change the rotary torque of the take-up spool.

10. The ink-ribbon conveying mechanism according to claim 9, further comprising wound-diameter detection means determining whether a wound diameter of the ink ribbon around the take-up spool has reached a predetermined value,
   wherein the drive transmission unit changes the selection of the clutch disks to which the driving force from the driver is to be transmitted if the wound-diameter detection means determines that the wound diameter of the ink ribbon has reached the predetermined value.

11. A printer comprising:
   an ink-ribbon conveying mechanism that adjusts rotary torque of a take-up spool,
   wherein the ink-ribbon conveying mechanism includes
   a feed spool that feeds an ink ribbon used for printing towards a head,
   the take-up spool linked with a rotary shaft and rotating integrally with the rotary shaft so as to take up the ink ribbon,
   a plurality of clutch disks rotatably attached to the rotary shaft,
   a plurality of presser components attached to the rotary shaft and rotating integrally with the rotary shaft, the presser components sandwiching opposite surfaces of the clutch disks by a predetermined pressure,
   a driver that drives the clutch disks, and
   a drive transmission unit that makes a selection from among the plurality of clutch disks so as to transmit a driving force from the driver to the selected one or more clutch disks,
   wherein the drive transmission unit changes the selection of the clutch disks to which the driving force from the driver is to be transmitted so as to change the rotary torque of the take-up spool.

* * * * *